Dec. 10, 1946.        B. F. KRELWITZ        2,412,518
TRAP
Filed July 24, 1944         2 Sheets-Sheet 1

B. F. Krelwitz
INVENTOR.

BY Knowles
ATTORNEYS.

Dec. 10, 1946.  B. F. KRELWITZ  2,412,518
TRAP
Filed July 24, 1944  2 Sheets-Sheet 2

B. F. Krelwitz
INVENTOR.

BY CA Snow & Co.
ATTORNEYS.

Patented Dec. 10, 1946

2,412,518

UNITED STATES PATENT OFFICE 2,412,518

TRAP

Burdick F. Krelwitz, Milwaukee, Wis.

Application July 24, 1944, Serial No. 546,251

2 Claims. (Cl. 43—61)

This invention relates to traps of that type designed to catch animals without injury to them.

An object of the invention is to provide a trap which is simple in construction, can be set readily, and, when tripped, will snap shut so that the entrapped animal will be held securely until released.

A further object is to provide a trap which can be made of any desired size so as to be useful in trapping animals and/or birds of different sizes, it being possible, after setting the trap, to leave it with the assurance, that if tripped by an animal or bird, it will operate to confine the same until the owner of the trap returns to open it.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
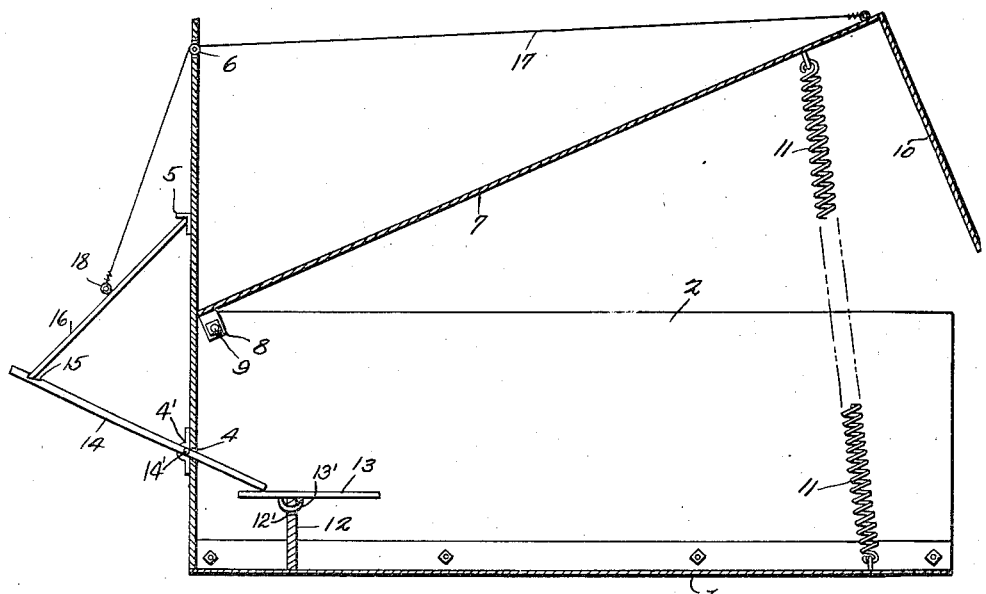
Fig. 1 is vertical longitudinal section through the trap showing the parts set.
Figure 2:
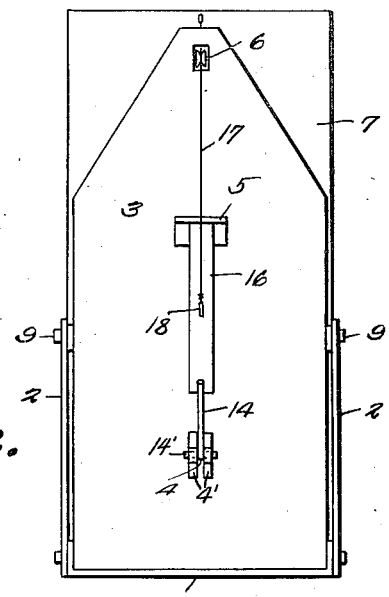
Fig. 2 is a front elevation showing the parts in the positions illustrated in Fig. 1.

Referring to the figures by characters of reference, 1 designates the bottom of the trap which can be provided with upstanding side walls 2. The front of the trap is closed by a panel 3 which is extended well above the walls 2 and has a small opening 4 located between the walls 2. A bracket 5 is extended outwardly from the panel 3 at a point above the walls 2 and in the upper portion of this panel is located a pulley 6.

The space between the tops of the walls 2 and the back ends thereof is adapted to be closed by a top plate 7 which is provided at its forward end with brackets 8 pivotally connected to the respective walls as shown at 9. This plate is proportioned to close the space between the upper edges of the walls 2 when the plate is in its lowermost position, and, for the purpose of closing the space between the back edges of these walls and at the same time support the plate 7 in its closed position, there is provided a door 10 preferably integral with the plate 7 and extended at right angles therefrom in a downward direction. One or more springs 11 connect the back portion of the top plate 7 to the bottom 1 and these springs are constantly under tension so that normally the door 10 closes the back end of the trap while the plate 7 closes the top thereof.

A small post or support 12 is secured to and extended upwardly from the bottom 1 near the panel 3 and pivotally mounted thereon is a bait pan 13. This pivot can be a conventional hinge or, as shown, an arcuate wire 13' working in an aperture 12' in the support 12. The rear portion of this bait pan is adapted to support bait while the forward portion is designed to be engaged by and held under restraint by a lever 14 which is loosely mounted in opening 4 and fulcrumed on a pin 14' in bracket 4'. The lever is extended well beyond the outer or front face of the panel 3. This lever has a notch 15 in its top edge near its outer or free end and this notch is positioned where it can receive the lower end of a strip 16 the upper end of which is adapted to engage the bracket 5. A wire or other flexible element indicated at 17 is secured at one end to the back portion of the top plate 7 and is extended over pulley 6 and then downwardly, its forward end being secured, as at 18 to the middle portion of the strip 16. Thus the spring 11 cooperates with plate 7, when raised, to exert a constant pull upon strip 16.

Figure 3:
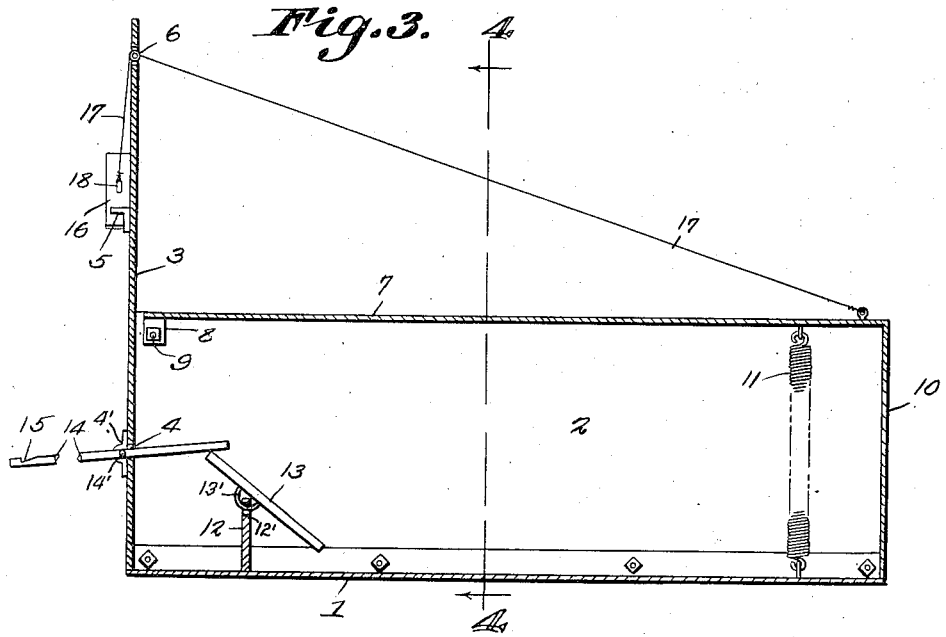
Fig. 3 is a view similar to Fig. 1, showing the position of the parts after certain parts of the trap have been released, some of the parts being broken away.
Figure 4:
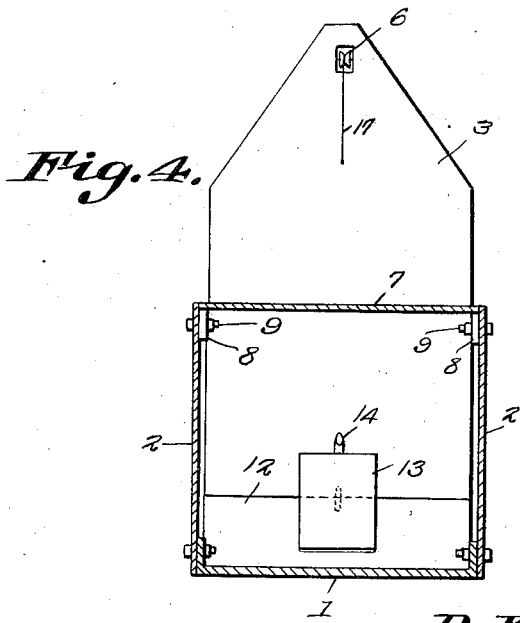
Fig. 4 is a section on line 4—4 Fig. 3.

When it is desired to use the trap, bait is placed on the rear portion of the pan 13 and the lever 14 is moved into position so as to overlie the pan 13. Strip 16 is then inserted between bracket 5 and notch 15 after it has been lowered by pulling on the connection 17 so as to raise top plate 7 against the tension of the spring or springs 11. The tension of the springs is sufficient to bind the ends of the strip 16 against the bracket 5 and one wall of the notch 15 respectively so that the weight of the bait on the pan 13 will not be sufficient to cause the pan to push the inner or lower end of lever 14 upwardly. When an animal to be trapped enters the structure for the purpose of eating the bait, the slight pressure on the bait resulting therefrom, will cause the lever 14 to be shifted so as to become disengaged from strip 16. Instantly the tensioned spring or springs 11 is released with the result that the plate 7 and the door 10 are snapped into position as shown in Fig. 3 and the animal thus is entrapped so that it cannot leave until after the plate 7 and door 10 have been raised by the user.

In practice this trap is found especially useful in entrapping fur-bearing animals, birds, rodents, etc.

What is claimed is:

1. A trap including a bottom, a front panel, and side walls, a pivoted plate constituting the top of the trap, a door positioned normally between the side walls of the trap and extended from and fixed relative to the top plate, a resilient connection between the top plate and the bottom of the trap and constituting means for holding the top plate and the back closure normally in shut position, a pivoted bait pan between the side walls of the trap, a lever extended through the panel and positioned to lap a portion of the bait pan and hold it in bait-supporting position, a stop bracket on the front panel, a strip interposed between the stop bracket and the lever for limiting the movement of the lever in one direction there being a notch in said lever for frictional engagement of one end of the strip, and a flexible connection between the strip and the top plate of the trap, said resilient connection and flexible connection cooperating to maintain a frictional contact between the strip and both the stop bracket and the lever while the trap is set.

2. The combination with the animal receiving portion of a trap having a closed bottom and open at the top and back and having a front panel extending upwardly above the top, of a top plate pivotally mounted, a door integral with the top plate and constituting means for closing the open back and supporting the top plate in closed position, a spring connecting the bottom to the top plate for holding said plate and door normally closed, a bait pan pivotally mounted within the trap, a lever extending through the panel and lapping the bait pan, a stop bracket, a restraining strip interposed between the stop bracket and the lever, there being a notch within the lever for receiving one end portion of the strip, and a flexible connection between the restraining strip and the top plate, said plate and spring cooperating, when the plate is in raised position and top open, to exert a constant pull upon the strip to maintain it in frictional engagement with the bracket and with the notched portion of the lever.

BURDICK F. KRELWITZ.